(12) United States Patent
Ayler

(10) Patent No.: US 6,808,227 B1
(45) Date of Patent: Oct. 26, 2004

(54) OVER-HEAD CAMPER TIE-DOWNS

(76) Inventor: Dana F. Ayler, P.O. Box 956, Gardnerville, NV (US) 89410

( * ) Notice: Subject to any disclaimer, the term of this patent is extended or adjusted under 35 U.S.C. 154(b) by 0 days.

(21) Appl. No.: 10/410,180

(22) Filed: Apr. 10, 2003

(51) Int. Cl.$^7$ .............................................. B60R 15/00
(52) U.S. Cl. ...................... 296/167; 410/100; 254/217
(58) Field of Search ............................... 296/167, 165, 296/100.18, 159, 166, 164, 36, 37.6, 100.16, 156; 410/106; 135/88.13

(56) References Cited

U.S. PATENT DOCUMENTS

| | | | | |
|---|---|---|---|---|
| 716,666 A | | 12/1902 | Butler | |
| 3,141,210 A | * | 7/1964 | Bryant | 296/167 |
| 3,337,259 A | * | 8/1967 | Henson | 296/167 |
| 3,368,785 A | * | 2/1968 | Weiler | 296/167 |
| 3,486,785 A | * | 12/1969 | Corson | 296/167 |
| 3,489,454 A | * | 1/1970 | Manteufel | 296/167 |
| 3,503,647 A | * | 3/1970 | Gostomski | 296/167 |
| 3,540,772 A | * | 11/1970 | Weiler | 296/167 |
| 3,549,194 A | * | 12/1970 | Matson | 296/167 |
| 3,638,895 A | * | 2/1972 | Henson | 296/167 |
| 3,655,234 A | * | 4/1972 | Kirschbaum | 296/167 |
| 3,658,376 A | * | 4/1972 | Dodgen et al. | 296/167 |
| 3,671,003 A | * | 6/1972 | Henson | 296/167 |
| 3,706,469 A | * | 12/1972 | Covert | 296/167 |
| 3,719,382 A | * | 3/1973 | Palm | 296/167 |
| 3,781,057 A | * | 12/1973 | Manuel | 296/167 |
| 3,782,774 A | * | 1/1974 | Sturek | 296/167 |
| 3,782,775 A | * | 1/1974 | Weiler et al. | 296/167 |
| 3,792,900 A | * | 2/1974 | Bugh | 296/167 |
| 3,806,265 A | * | 4/1974 | Hattan | 403/46 |
| 3,814,460 A | * | 6/1974 | Norrish | 296/167 |
| 3,837,701 A | * | 9/1974 | Curtis et al. | 296/167 |
| 3,965,539 A | * | 6/1976 | Golden | 242/388 |
| 3,985,341 A | * | 10/1976 | Akre | 242/396.5 |
| 4,103,959 A | * | 8/1978 | Whiting et al. | 296/167 |
| 4,606,096 A | * | 8/1986 | Wood et al. | 24/68 CT |
| 4,770,394 A | * | 9/1988 | Yang | 254/335 |
| 4,993,898 A | * | 2/1991 | Klahold | 410/12 |
| 5,271,606 A | * | 12/1993 | Kamper | 254/217 |
| 5,542,798 A | * | 8/1996 | Rawdon et al. | 410/100 |
| 5,549,429 A | * | 8/1996 | Sergent | 410/100 |
| 6,106,052 A | * | 8/2000 | Shaw | 296/167 |
| 6,145,920 A | * | 11/2000 | Rasmussen | 296/167 |
| 6,260,910 B1 | * | 7/2001 | Kay | 296/167 |
| 6,524,041 B1 | * | 2/2003 | Voiculescu | 410/100 |
| 6,547,218 B2 | * | 4/2003 | Landy | 254/217 |
| 2001/0045548 A1 | * | 11/2001 | Landy | 254/217 |
| 2003/0111650 A1 | * | 6/2003 | Gleinser | 254/237 |

* cited by examiner

Primary Examiner—Kiran Patel
(74) Attorney, Agent, or Firm—Shlesinger, Arkwright & Garvey LLP

(57) ABSTRACT

A hold down mechanism for securing a camper to a vehicle bed which provides a spring lever connected to the undercarriage of the vehicle which is flexible in a vertical direction and which acts as a shock absorber when the vehicle is in motion over various rough road conditions and the like. The assembly provides a device for readily releasing the tie-downs of the camper or adjusting the same with regard to the vehicle mounts.

11 Claims, 4 Drawing Sheets

OVER-HEAD CAMPER TIE-DOWNS

FILED OF THE INVENTION

This invention relates to a camper tie-down assembly which will absorb shock under various road conditions and which permits ease in adjusting or releasing the camper from the vehicle.

BACKGROUND OF THE INVENTION

Over the years various campers have been designed to fit onto the bed of a pick-up truck. In order to keep the camper from dislodging itself from the bed, various tie-downs have been developed including such devices as shown in the patents to Weiler U.S. Pat. No. 3,368,785, Kay U.S. Pat. No. 6,260,910, Henson U.S. Pat. No. 3,337,259, Kirchbaum U.S. Pat. No. 3,655,234, Butler U.S. Pat. No. 716,666, Norrish U.S. Pat. No. 3,814,460, Covert 3,706,469 and Palm U.S. Pat. No. 3,719,382. Many of these references use a turnbuckle for adjusting tension, but none allow for shock absorbing means, and require considerable time for installation of the camper on the vehicle.

OBJECTS AND SUMMARY

It is an object of this invention to provide a camper tie-down assembly which absorb shock during travel of the vehicle over various types of terrain and the like.

Yet a further object of this invention is to provide a tie-down assembly which can be adjusted in a timely fashion and which permits ease in installation of the camper on the vehicle as well as ease in removal therefrom.

Yet another object of this invention is to provide a camper tie-down assembly which will not cause injury to the vehicle body styling such as damage to the body paint and alignment.

A further object of this invention is to reduce road fatigue on parts of the assembly as well as reduced fatigue on the connector built into the camper.

Still a further object of this invention is to provide a camper tie-down assembly which does not require tension readjustment and which permits equal and constant downward pressure on all sides of the camper and vehicle while permitting flexing of several inches downwardly and upwardly (preferably about 3 inches) during travel of the vehicle over rough terrain or the like.

Still a further object of this invention is to eliminate the need for turn buckles which frequently come loose or are vandalized in parking lots.

A further object of this invention is to provide a time saving mechanism which shortens the installation time by eliminating turn buckles which require considerable installation time.

Still another object of this invention is to make it easy to adjust the leveling of a camper at a campsite on which the vehicle is not parked horizontally and may be on a slope or the like.

In addition, a further object is to provide a tie-down which has general application for holding down various loads on trucks or the like including pallets, lumber, truck tops, and other equipment such as used on flat bed truck trailers or the like.

Another object of this invention is to provide a simple tie-down mechanism which is durable, requiring few parts, providing a quick 1-bolt removal of spring for non-use/storage and is inexpensive and easily manufactured.

In summary, this invention pertains to a camper tie-down assembly or the like which utilizes a spring lever which flexes in a vertical direction to take up road shock and which permits ease in installation.

The advantages of this invention will be apparent from a review of the following description and drawings which are as follows:

DETAILED DESCRIPTION OF THE DRAWINGS

Figure 1:
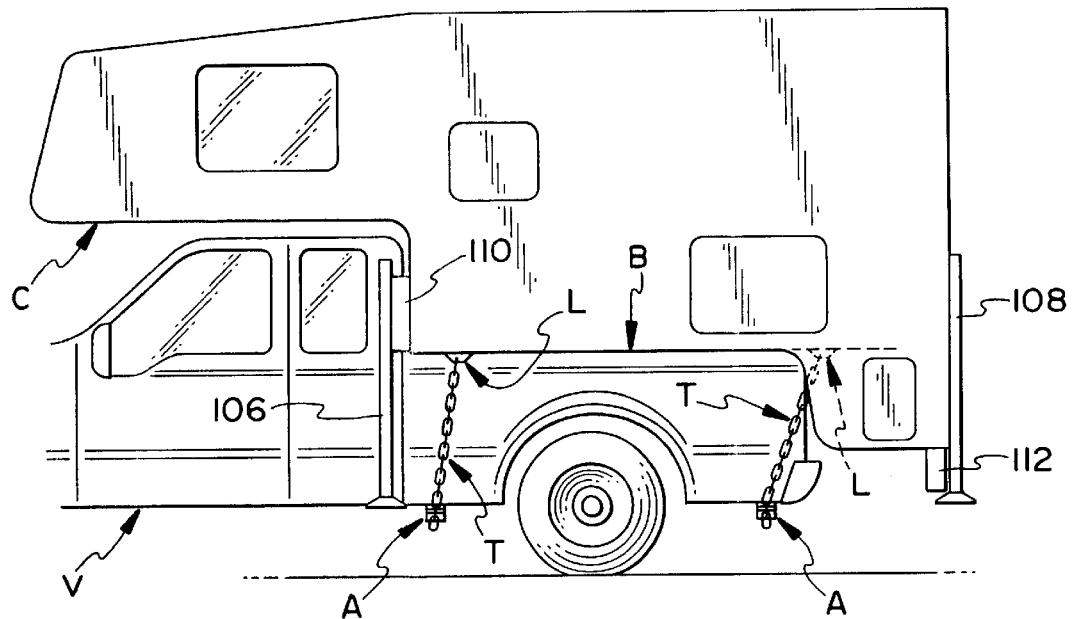
FIG. 1 is a partial side elevation of a vehicle camper unit with tie-downs T.
Figure 2:
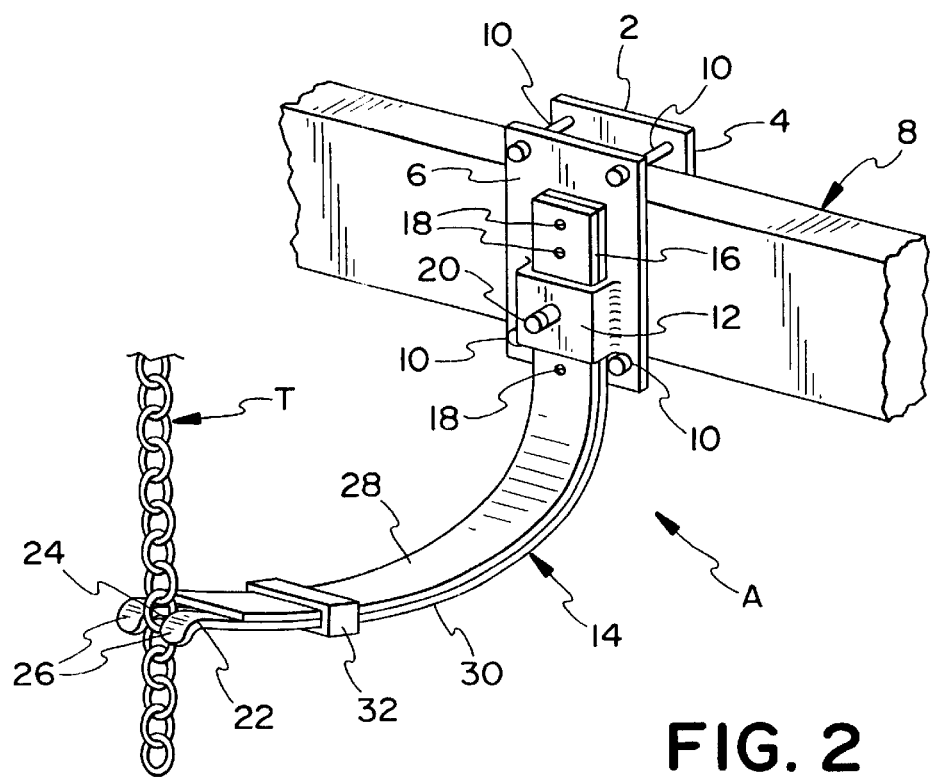
FIG. 2 is a fragmentary perspective view of the tie-down assembly mounted on a vehicle frame.
Figure 3:
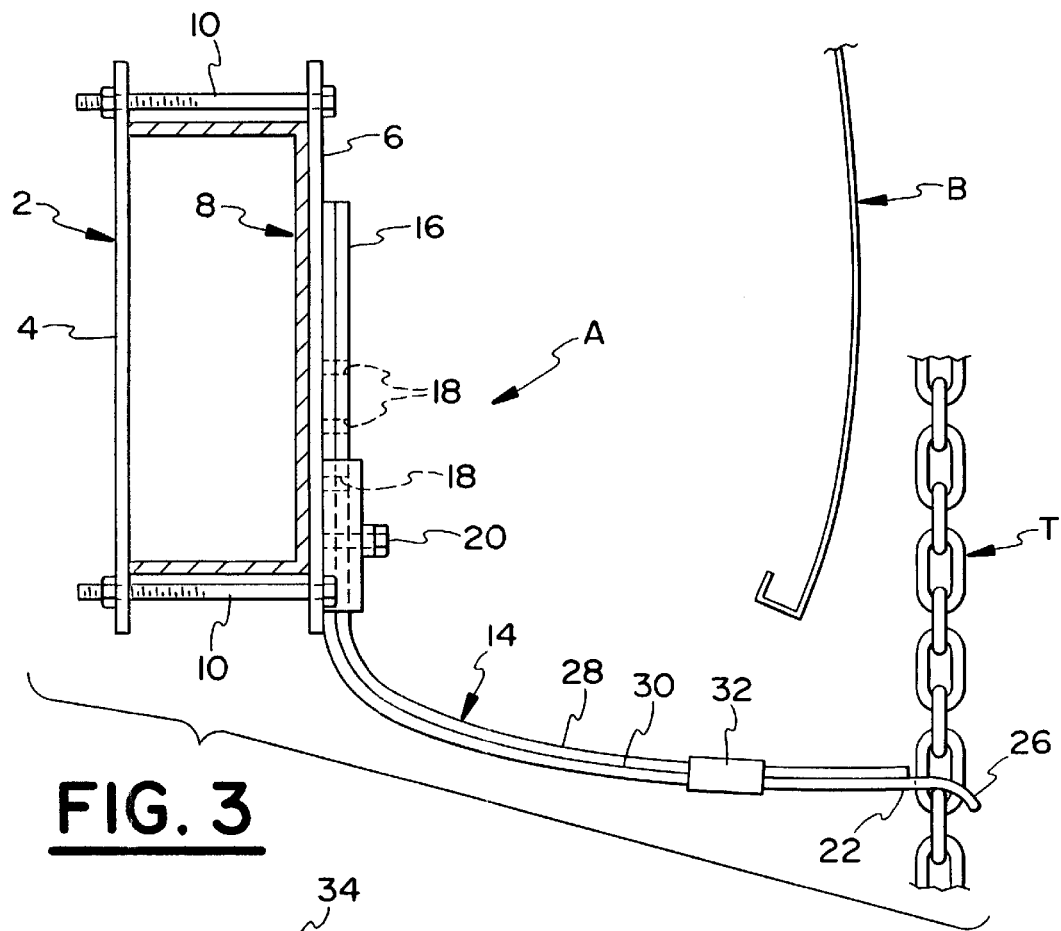
FIG. 3 is a side elevation of the tie-down assembly with a portion of the vehicle bed showing clearance of the lever spring.

FIGS. 1, 2 and 3

FIG. 1 shows a typical camper C mounted on vehicle V which has as bed B. Tie-downs T are mounted on either side of the vehicle V and connected to the camper by securement lugs or brackets L. The tie-downs T may be chains or straps or other type of securement devices which are removably connected to the tie-down assembly A.

As shown in FIGS. 2 and 3, the tie-down assembly A comprises a mounting bracket 2 consisting of plates 4 and 6 secured to the vehicle frame 8 by means of bolts 10 or the like. Plate 6 includes a U-shaped channel strap 12 which may be welded to plate 6 or otherwise secured thereto such as pressed formed therein. A substantially arcuate upwardly shaped spring ever 14 has one end 16 vertically mounted in the U-shaped channel strap 12. The end of spring lever 16 includes adjustment holes 18 which receive a lock bolt 20 mounted in the U-shaped channel straps 12. The adjustment holes 18 and the lock bolt 20 permit the spring lever 14 to be adjusted vertically depending upon the clearance required to go under the bed B of the vehicle V without doing injury to the bed B during movement up and down of the spring lever 14 when traveling over rough terrain or the like. The spring lever 14 extends outwardly beyond the truck bed B so as to avoid contact by the tie-down with the outer surface of the bed B avoiding injury thereto. The outer end 22 of the spring lever 14 is slotted as at 24 to provide fingers 26 which are bent downwardly for reasons subsequently explained. The tie-down T engages between the fingers 26 in slot 24 and when positioned is locked therein. As shown in FIGS. 2 and 3, the spring lever 14 comprises leaves 28 and 30 which are held together by strap 32 typical of leaf springs of vehicles.

FIG. 4

Figure 4:
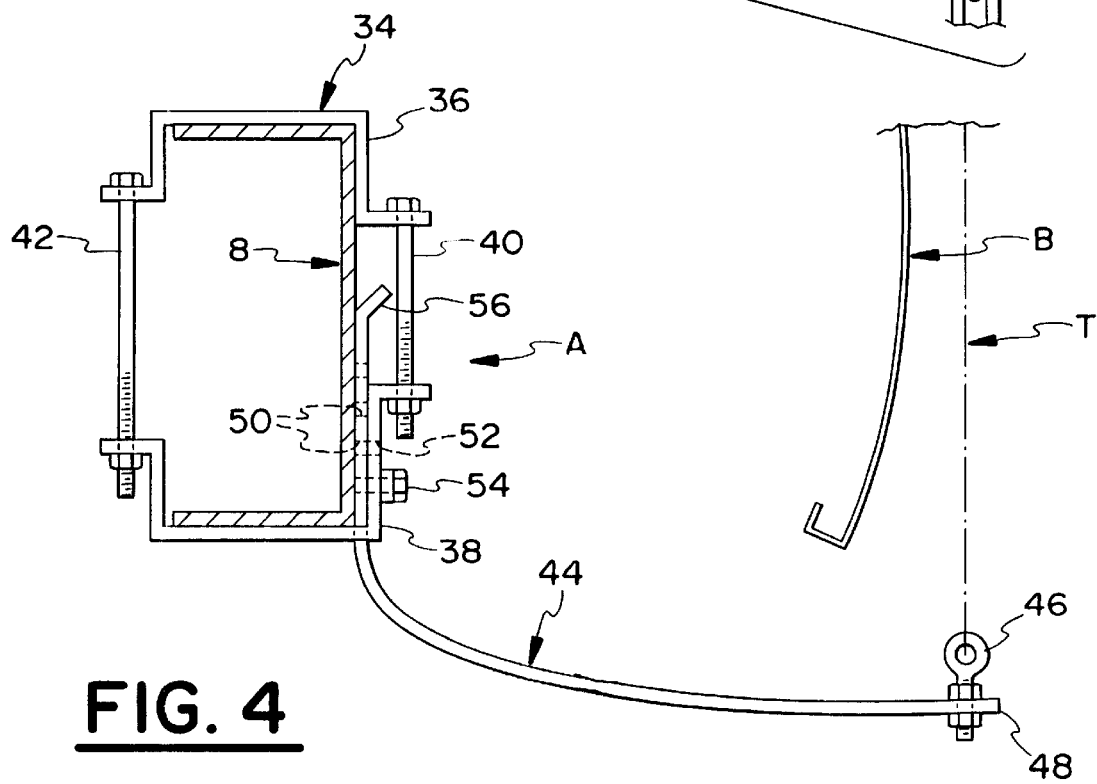
FIG. 4 is a side elevation of a modified tie-down assembly mounted on the vehicle bed.

FIG. 4 shows a modification in which the mounting bracket 34 is mounted on the frame 8 by U-shaped plates 36 and 38 secured by bolts 40 and 42. The spring 44 can be adjustably positioned in a slot (not shown) in the plate 38 by movement up and down. An eye bolt 46 is provided in an opening 48 in the spring lever 44. Spring 44 has adjustment holes 50 which cooperates with adjustment holes 52 in the plate 38. A bolt 54 locks the spring 44 in adjustment position. For safety purposes, the adjustment end of the spring 44 is bent at end 56 to prevent the spring 44 from disengaging from the mounting bracket 34.

Figure 6:
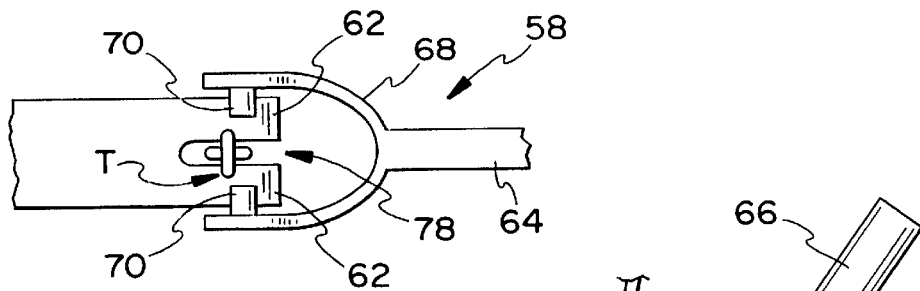
FIG. 6 is a fragmentary bottom plan view of the yoke in position on the spring lever.
Figure 5:
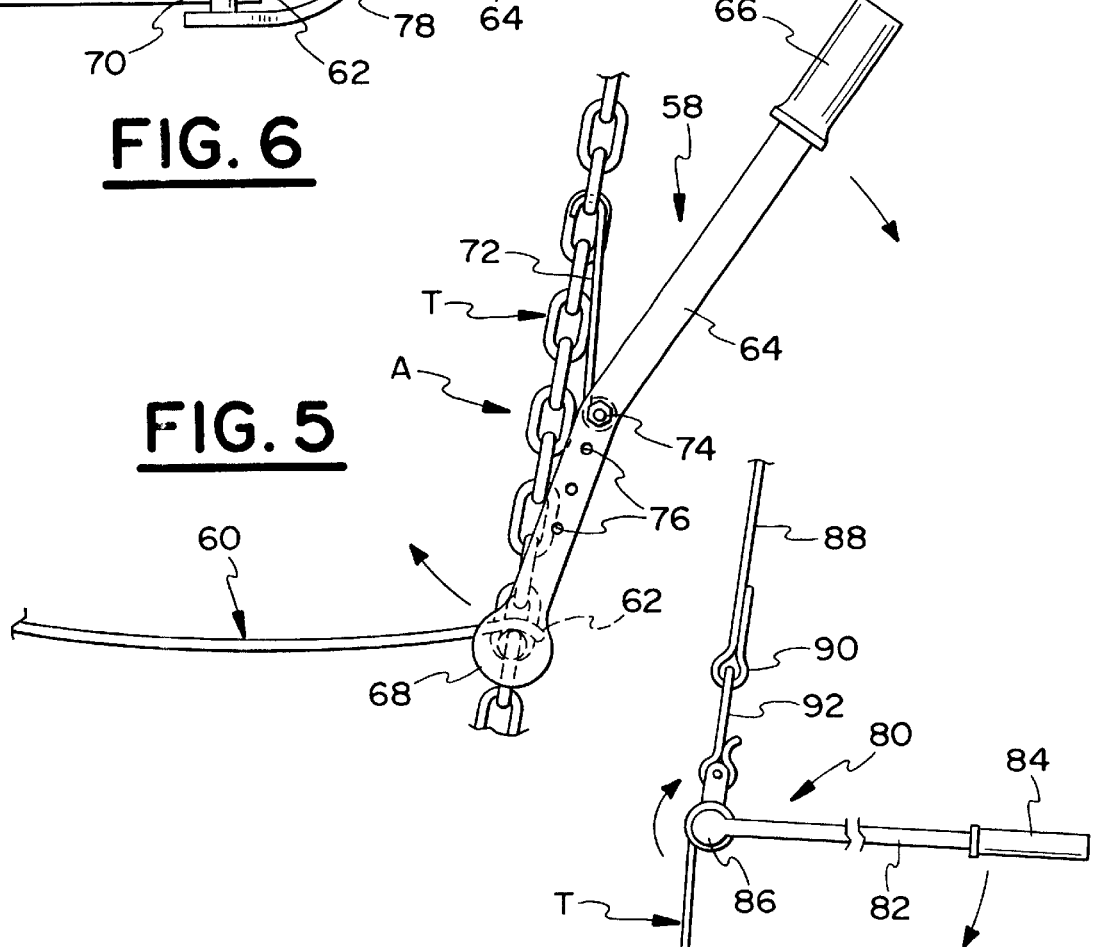
FIG. 5 is a fragmentary side elevation of a release mechanism.

FIGS. 5 and 6

In FIGS. 5 and 6, a release mechanism 58 is provided for releasing the tie-down T from the spring lever 60 and bent down fingers 62. The release mechanism 58 includes a bar 64 having at one end a handle 66 and at the other end a yoke 68. The yoke 68 is provided with lugs 70 which engage beneath the bent fingers 62. A hook 72 pivots about bolt 74 mounted on the bar 64 of the release mechanism 58. Adjustment holes 76 are provided on the bar 64 to permit the hook 72 to be moved to obtain a mechanical advantage as needed.

Operation of FIGS. 5 and 6

In the operation of FIGS. 5 and 6, the lugs 70 of the yoke 68 are positioned beneath the fingers 62 and the hook 72 is positioned on the tie-down T. Placing the hand on the handle 66 and applying downward pressure in the direction of the arrow shown in FIG. 5, the lugs 70 will cause the spring lever 60 to raise permitting the tie-down T to be released from the slot 78 for adjustment purposes or for removal of the camper C. The release mechanism 58 is designed to be quickly positioned for quick operation of the release of the tie-down T from the slot 78 of the spring lever 60.

FIG. 7

Figure 7:
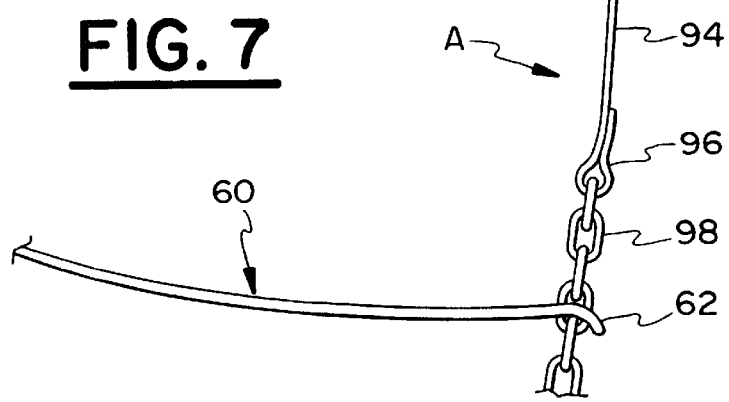
FIG. 7 is a fragmentary side elevation of a modification of the release mechanism.

In FIG. 7, the tie-down T is released by a release mechanism 80 which comprises a bar 82 with a handle 84 and a ratchet mechanism 86 such as commonly used in farm fencing tighteners (not shown in detail). The ratchet mechanism 86 has a two-way pawl and ratchet (not shown) which allows the bar 82 and handle 84 when lifted to release the tie-down T and when pushed down to tighten the tie-down T. The tie-down T comprises a strap 88 having a loop 90 into which a hook 92 engages. The end of the hook 92 is secured to the ratchet mechanism 86. A strap 94 is connected to the ratchet mechanism 86 and wraps around a spool (not shown) which when cranked downwardly by handle 84 or bar 82, will tighten strap 94. At the end of strap 94 is a loop 96 which is secured to a link of chain 98. Tightening of the ratchet mechanism 86 lifts the spring lever 60 to create the required tension. Loosening of the ratchet mechanism allows the tie-down T to slacken releasing the chain 98 from the fingers 62.

Figure 8:
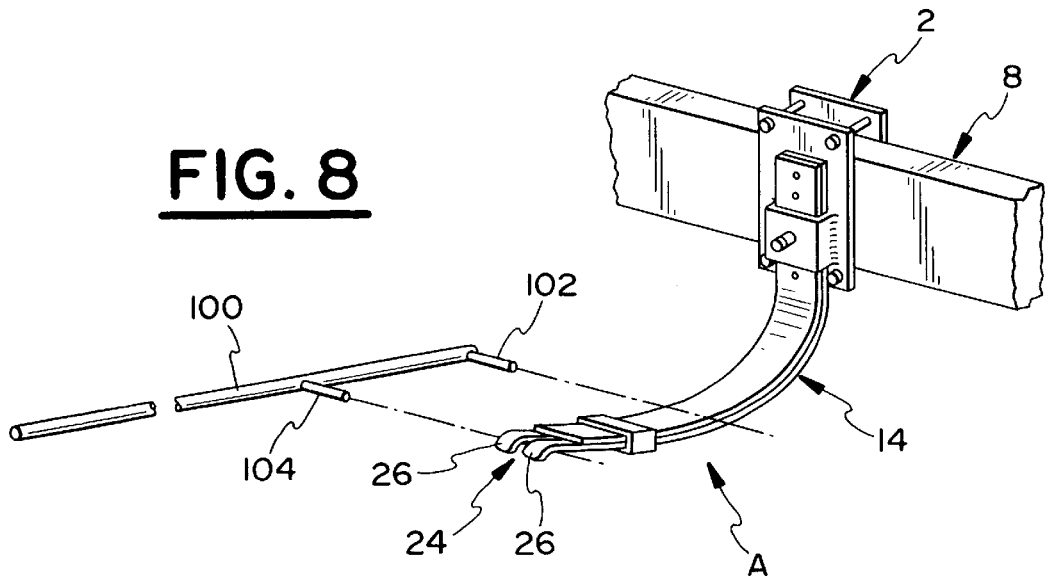
FIG. 8 is a fragmentary exploded view in perspective of a modified release mechanism.
Figure 9:
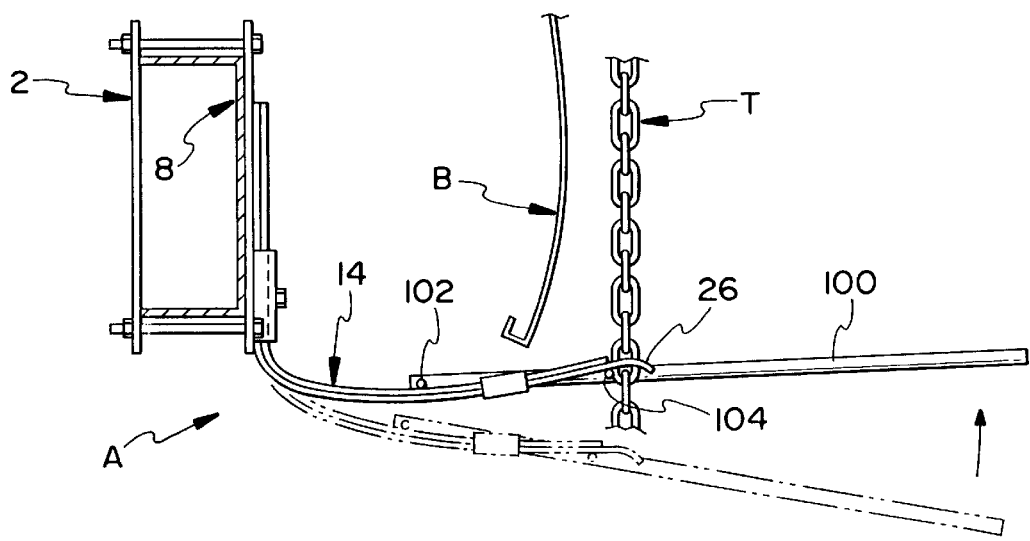
FIG. 9 is a side elevation with a portion shown in phantom to show upper and lower positions of the release mechanism of FIG. 8.

FIGS. 8 and 9

In FIGS. 8 and 9, a bar 100 is provided with a lateral end lug 102 and a lateral intermediate lug 104. Lug 102 is placed above the spring lever 14 and lug 104 is placed beneath the spring lever 14. Upward movement of the bar 100 will cause the spring lever 14 to be moved upwardly thereby to release the tie-down T.

Camper Leveling

It will be noted in FIG. 1 that the camper C is provided with leveling jacks 106 and 108 provided with motors 110 and 112. When the vehicle is parked on a hill or the like, the camper C can be made level so that sleep will.not be on a tilt. The leveling jacks 106 and 108 are lowered and adjusted to permit the camper to be leveled though the vehicle itself may be tilted. Thus the present assembly A permits ease in adjustment of the tie-down assembly A with a minimum of difficulty.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed:

1. A camper tie-down assembly for securing a camper or the like to a vehicle bed comprising:
    a) a vehicle frame mounting bracket for securing said camper tie-down assembly beneath said bed and to said vehicle frame;
    b) a substantially arcuate upwardly shaped spring lever flexible in a vertical direction mounted on and extending laterally from said frame mounting bracket and having first and second ends;
    c) said first end of said spring lever vertically secured to said vehicle frame mounting bracket;
    d) said second end of said spring lever when said vehicle frame mounting brackets is secured to said vehicle frame extending below and outwardly beyond and at all times clear of said vehicle bed when said spring lever is flexing in a vertical direction; and
    e) said spring lever at said second end having tie-down engaging means for securement to a camper tie-down.

2. The camper tie-down assembly as in claim 1, and wherein:
    a) said vehicle frame mounting bracket including spring lever adjustment means.

3. The camper tie-down assembly as in claim 1, and wherein:
    a) said spring lever including vehicle frame mounting bracket adjustment means.

4. The camper tie-down assembly as in claim 1, and wherein:
    a) said spring lever is a leaf spring.

5. The camper tie-down assembly as in claim 1, and wherein:
    a) said second end of said spring lever including a camper tie-down engaging slot.

6. The camper tie-down assembly as in claim 5, and wherein:
    a) said camper tie-down engaging slot is formed by a pair of extending downwardly bent fingers.

7. The camper tie-down assembly as in claim 6, and including:
    a) a camper tie-down release mechanism for applying a vertical force to said spring lever to release said camper tie-down from said camper tie-down engaging slot.

8. The camper tie-down assembly as in claim 5, and wherein:
    a) said camper tie-down release mechanism includes a crank;
    b) said crank having a handle at an end and a yoke at the other end for engaging said downwardly bent fingers;

c) an adjustable hook intermediate of said crank for engaging said tie-down above said downwardly bent fingers;
d) whereby downward pressure on said handle will cause said downwardly bent fingers and said spring lever to raise vertically to release said tie-down from said slot.

9. The camper tie-down assembly as in claim 5, and wherein:
   a) said camper tie-down release mechanism includes a crank; said crank having spaced first and a second lugs;
   b) whereby when said first lug is positioned under said spring lever and said second lug is positioned above said spring lever, upward pressure on said crank will cause said camper tie-down to release from said camper tie-down engaging slot.

10. The camper tie-down assembly as in claim 7, and wherein:
    a) said camper tie-down release mechanism includes a pawl and ratchet crank handle release.

11. The camper tie-down assembly as in claim 1, and wherein:
    a) said spring lever has a vertical upward flex of about 3 inches from normal and a vertical downward flex of about 3 inches from normal.

\* \* \* \* \*